3,149,077
FIRE-RESISTANT FUNCTIONAL FLUIDS
James B. Davis, Kirkwood, Mo., assignor to Monsanto Company, a corporation of Delaware
No Drawing. Filed Mar. 5, 1959, Ser. No. 797,324
9 Claims. (Cl. 252—75)

This invention relates to fire-resistant functional fluid compositions having improved lubricating properties. More particularly, the compositions of this invention are composed of a major proportion of certain chlorinated aromatic hydrocarbons and a small amount of a polyvalent metal salt of an ester of dithiophosphoric acid, which can be represented by the structure,

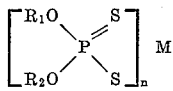

where M is a salt-forming polyvalent metal, $n$ is the valence of said metal, and $R_1$ and $R_2$ are like or unlike and are selected from saturated acyclic, saturated alicyclic, aromatic and substituted aromatic radicals containing from 1 to 30 carbon atoms, but preferably containing from 3 to 15 carbon atoms. These metal salts are hereinafter termed "thiophosphates."

The functional fluids of this invention are used as force transmission fluids for the transmission of pressure, power or torque in fluid pressure or torque actuated mechanisms, such as, for example, the "hydraulic fluids" for transmitting fluid pressure to the ram cylinders of hydraulic presses or in devices for the absorption and dissipation of energy such as shock absorbers or recoil mechanisms, or for transmission of torque through torque converter types of fluid couplings. The functional fluids of this invention may also be used as damping fluids, which are the liquid compositions used for damping mechanical vibrations or resisting other rapid mechanical movements. The functional fluids of this invention are also suitable for use as lubricants between relatively moving mechanical parts, as bases for synthetic greases, and as the liquid material in air filtering systems.

Chlorinated biphenyl containing from about 20% to about 60% by weight of combined chlorine is generally useful for the preparation of the functional fluids of this invention, however chlorinated biphenyl containing from about 40% to 55% by weight of combined chlorine is preferred as providing fluids having pour point and viscosity characteristics most suitable for use as force and torque transmission fluids. Chlorinated biphenyl within this preferred range is commercially available as products containing about 42%, 48%, 54% or 60% of combined chlorine corresponding approximately to tri-, tetra-, penta- and hexachlorobiphenyl, respectively. The expressions "chlorinated biphenyl containing 40% to 55% of combined chlorine" and "chlorinated biphenyl containing 20% to 60% of combined chlorine" are used herein as not only including these direct chlorinated products, but also as blends of one or more of the chlorinated biphenyls whereby the total chlorine content is broadly within the range of 20% to 60%, preferably within the range of 40% to 55% by weight. For example, chlorinated biphenyl containing a total of 45% by weight of combined chlorine can be effectively prepared, for the purpose of this invention, by blending together 50 parts by weight of chlorinated biphenyl containing 42% by weight of combined chlorine and 50 parts by weight of chlorinated biphenyl containing 48% by weight of combined chlorine. In a similar manner, to further illustrate, chlorinated biphenyl containing a total of 58% by weight of combined chlorine, for purposes of this invention, may be effectively prepared by blending together 25 parts by weight of chlorinated biphenyl containing 52% by weight of combined chlorine and 75 parts by weight of chlorinated biphenyl containing 60% by weight of combined chlorine. Therefore, for purposes of this invention, the chlorinated biphenyl containing generally 20% to about 60%, or preferably 40% to 55%, by weight of combined chlorine may be obtained either by direct chlorination of the biphenyl to obtain the desired combined chlorine content, or a satisfactory material may be obtained by blending together two or more chlorinated biphenyls to obtain a resulting blend of chlorinated biphenyl containing an effective quantity of combined chlorine within the ranges designated above.

Chlorinated biphenyl, as described above, comprises the major proportion of the chlorinated aromatic hydrocarbon content of the functional fluids of this invention, and it is generally preferred that such chlorinated biphenyl constitute at least 90% and even more desirably essentially the entire chlorinated aromatic hydrocarbon content of the functional fluids of this invention. On the other hand, while the chlorinated aromatic hydrocarbon content is made up of at least 50% by weight of chlorinated biphenyl, the remaining 50% of chlorinated aromatic hydrocarbon content can be other chlorinated aromatic hydrocarbons such as trichlorobenzene and partially chlorinated terphenyl. In particular, the use of trichlorobenzene in an amount so as to equal up to about 10% to 15% of the chlorinated aromatic hydrocarbon content of the functional fluid is quite desirable where a fluid is to be used under conditions of low temperature, since the pour point temperature and viscosity at low temperatures of the fluid can be significantly reduced by such use of trichlorobenzene without also effecting a significant undesired decrease in lubricating properties of the fluids.

With respect to the structural formula for the thiophosphates, as hereinabove set out, examples of saturated acyclic radicals from which $R_1$ and $R_2$ can be selected are propyl, butyl, isobutyl, sec.-butyl, amyl, isoamyl, hexyl, isohexyl, 3-methylhexyl, octyl, isooctyl, 2-ethylhexyl, decyl, dodecyl, tetradecyl and hexadecyl; of saturated alicyclic radicals from which $R_1$ and $R_2$ can be selected are cyclopentyl, cyclohexyl, methylcyclohexyl, ethylcyclohexyl and amylcyclohexyl; of aromatic radicals and substituted aromatic radicals from which $R_1$ and $R_2$ can be selected are those radicals having six or more carbon atoms, such as phenyl, methylphenyl, ethylphenyl, dimethylphenyl, propylphenyl, butylphenyl, tert.-butylphenyl, chlorophenyl, cyclohexylphenyl, di-tert.-butylphenyl, octylphenyl, nonylphenyl, decylphenyl, and the like. As used herein, aromatic includes also aromatic substituted radicals, such as benzyl and phenethyl.

The thiophosphates contemplated by this invention may be prepared by a variety of methods known to the art, e.g., by mixing an organic phosphorodithioic acid of the structure,

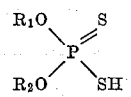

wherein $R_1$ and $R_2$ have the aforedescribed significance, with an excess of the oxide, hydroxide or carbonate of the desired polyvalent metal. The aforedescribed ester is readily obtained by well-known methods, for example, by reacting about four molecular proportions of an alcohol (ROH) with about one molecular proportion of phosphorus pentasulfide at about 100° C. over a period of about three to six hours.

As a non-limiting example of the preparation of a polyvalent metal salt of a dithio acid of phosphorous, the following is given:

EXAMPLE 1

To a suitable reaction vessel are added and intimately mixed approximately four molecular proportions of methyl isobutyl carbinol and approximately one molecular proportion of phosphorus pentasulfide. The mixture is heated at 90–100° C. for about three hours employing a pressure slightly below atmospheric. Thereafter the reaction product (a dithiophosphoric acid) is decanted from the unreacted phosphorus pentasulfide and admixed with a small amount of water and zinc oxide in excess of that theoretically required. The mixture is heated at about 60° C. for about three hours, cooled and filtered. The dark oily salt of di(1,3-dimethylbutyl) dithiophosphoric acid so obtained analyzes approximately, in weight ratio, one part of phosphorus and approximately 2.2 parts of sulfur per one part of zinc.

The source of the $R_1$ and $R_2$ radicals can be alcohols, and, further, the alcohols can be natural or synthetic. When $R_1$ and $R_2$ are alkyl radicals, the synthetic alcohols derived from an oxo process or from the catalytic hydrogenation of coconut oil are particularly desirable as a source for such radicals. In the case of alcohols produced in an oxo process, the olefin used preferably has from three to fifteen carbons, e.g., propylene, butylene, isobutylene, pentene, hexene, including propylene dimer, octene, nonene, including propylene trimer, decene, dodecene, including propylene tetramer and propylene pentamer. Since $R_1$ and $R_2$ can be different, the use of mixtures of alcohols is within the scope of the invention. Thus, a mixture containing predominantly n-decyl and n-octyl alcohols obtained from the catalytic hydrogenation of coconut oil is quite suitable. Alcohols such as cyclobutanol, cyclopentanol, cyclohexanol and methylcyclohexanol also can be used.

Particularly efficacious combinations, where $R_1$ and $R_2$ are different alkyl radicals, can be obtained by first reacting two different alcohols with $P_2S_5$. Preferably one of the alcohols used contains five or less carbon atoms, such as methyl alcohol, ethyl alcohol, propyl alcohol, isopropyl alcohol, butyl alcohol, isobutyl alcohol, tert.-butyl alcohol, and the amyl alcohols, such as secondary amyl alcohol. The other alcohol used should preferably be one containing more than five carbon atoms, preferably six to twenty carbon atoms, such as hexyl alcohol, methyl isobutyl carbinol, ethyl isopropyl carbinol, heptyl alcohol, 2-ethylhexyl alcohol, octyl alcohol, nonyl alcohol, decyl alcohol, dodecyl alcohol, tridecyl alcohol, pentadecyl alcohol, hexadecyl alcohol, octadecyl alcohol and eicosyl alcohol. When using an alcohol from each of the above-described groups, they need not be present in equimolar quantities in the reaction mixture, although the use of about one to five mols of an alcohol having more than five carbon atoms per mol of alcohol having five or less carbon atoms generally provides a product possessing a good balance of properties, such as solubility and lubricating efficiency. It also has been found that, instead of using a mixture of the alcohols described in the reaction with $P_2S_5$ and thus obtaining a chemical mixture of R's, a physical mixture of esterified phosphorodithioic acids may be used, each of which contains two identical R groups which, however, are different than the R groups of the other esterified phosphorodithioic acids. Thus, for example, a mixture of isopropanol and 2-ethylhexanol can be reacted with $P_2S_5$ followed by neutralization of the reaction product with zinc oxide, or $P_2S_5$ can be reacted separately with isopropanol and 2-ethylhexanol, the reaction product for each of these reactions mixed and the mixture neutralized with zinc oxide.

The polyvalent metals (M) which can be used are zinc, calcium, barium, magnesium, cadmium, strontium, aluminum, lead, mercury, tin and nickel, although zinc, calcium and barium are preferred. Also, mixtures of metal salts can be used, such as is obtained, for example, by performing the neutralization with a mixture of zinc oxide and calcium oxide.

The amount of thiophosphate to be used to provide the fluid compositions of this invention can range from about 0.01% to about 5.0% by weight, although the use of about 0.1% to about 1.0% by weight is preferred for most applications.

Although chlorinated biphenyl as described for use in this invention possesses fairly good anti-wear characteristics, such chlorinated biphenyl is deficient in the lubricating properties required for many applications. We have now discovered that by incorporating metal salts of esters of a thiophosphoric acid into chlorinated biphenyl the lubricating properties thereof can be greatly enhanced, thus providing a fluid composition suitable for use in areas of application where chlorinated biphenyl cannot be used alone. Thus, for example, chlorinated biphenyl having about 45% combined chlorine was compared on the Shell 4-ball machine to a fluid composition composed of 99.5% chlorinated biphenyl having about 45% combined chlorine and 0.5% of zinc dihexyldithiophosphate prepared as in Example 1 using steel-on-steel balls, a 40 kg. load, a speed of 630 r.p.m., a temperature of 167° F., and a time of one hour. The chlorinated biphenyl alone gave a scar diameter of about 0.80 mm., whereas the fluid composition described above gave a scar diameter of about 0.60 mm. Other fluid compositions of this invention show increased lubricating properties of about the same magnitude.

The physical properties of the fluid compositions of this invention vary somewhat, depending primarily upon the amount of combined chlorine present in the chlorinated biphenyl component. Listed in Table I below are physical properties of functional fluid compositions of this invention containing about 99.5% of chlorinated biphenyl and about 0.5% of the thiophosphate of Example 1.

*Table I*

|  | Fluid Composition No. | | | | |
|---|---|---|---|---|---|
|  | 1 | 2 | 3 | 4 | 5 |
| Percent combined chlorine of the chlorinated biphenyl. | 42 | 45 | 48 | 54 | 60. |
| Color and form | Very light yellow oily liquid. | Light yellow oily liquid. | Very light yellow oily liquid. | Light yellow oily liquid. | Yellow oily liquid. |
| Specific gravity 25° C./25° C | 1.38 | 1.42 | 1.45 | 1.55 | 1.62. |
| Flash Point—Cleveland Open Cup, °F. (ASTM D-92). | 348–356 | 376–382 | 379–384 | None | None. |
| Fire Point—Cleveland Open Cup, °F. (ASTM D-92). | None [1] | None [1] | None | None | None. |
| Pour Point, °F. (ASTM D-97) | 2 | 5 | 20 | 50 | 88. |
| Viscosity—Saybolt 210° F | 34–35 | 35–36 | 36–37 | 44–48 | 72–78. |
| Universal Second 100° F. (ASTM D-88) | 80–93 | 127–157 | 185–240 | 1800–2500 |  |

[1] None—indicates no fire point up to boiling temperature.

In general, the fluid compositions of this invention are light yellow oily liquids which are slightly cloudy.

In addition to the high degree of fire resistance of the fluid compositions of this invention, indicated by the flash point and fire point of said compositions, other tests were run to further demonstrate fire resistance. These tests and the observed results are given below.

Table II

| | Fluid Composition No. | | |
|---|---|---|---|
| | 1 | 2 | 3 |
| Hot Manifold Test (MIL-F-7000), 1300° F. | Does not flash or burn on tube or after leaving tube. | Same. | Same. |
| Low-Pressure Spray Flammability Test (AMS 3150-F). | Flame brightened but did not increase. | Same. | Same. |
| High-Pressure Spray Flammability Test (AMS-3150-B). | Will not ignite. | Same. | Same. |

Addition agents which are compatible with the fluid compositions of this invention and which impart rust-inhibition properties and also a further increase in lubricating characteristics are the reaction products obtained by reacting monocarboxylic acids, polyalkylene-polyamines having one more nitrogen atom per molecule than there are alkylene groups in the molecule, and alkenyl succinic acid anhydrides, which reaction products are fully described in and prepared according to the method of United States Patent No. 2,568,876. These agents are hereinafter termed "polyamines." More particularly, these anti-rust agents are obtained by reacting a monocarboxylic acid with a polyalkylene-polyamine having one more nitrogen atom per molecule than there are alkylene groups in the molecule, in a molar proportion varying between about one and about $(x-1)$ to one, respectively, wherein $x$ represents the number of nitrogen atoms in the polyalkylene-polyamine molecule, to produce an intermediate product, and reacting the alkenyl succinic acid anhydride with the intermediate product, in a molar proportion varying between about $(x-1)$ to one, respectively; the sum of the number of mols of the monocarboxylic acid and of the alkenyl succinic acid anhydride reacted with each mol of said polyalkylene-polyamine being no greater than $x$.

In general, the polyalkylene-polyamine reactants utilizable herein are those compounds having the structural formula, $H_2N(RNH)_zH$, wherein R is an alkylene radical, or a hydrocarbon radical-substituted alkylene radical, and $z$ is an integer greater than one, there being no upper limit to the number of alkylene groups in the molecule. It is preferred, however, to use the polyethylene-polyamines. These compounds have the formula, $$H_2N(C_2H_4NH)_zH$$

wherein $z$ is an integer varying between about two and about six. Non-limiting examples of the polyalkylene-polyamine reactants are diethylenetriamine; triethylenetetramine; tetraethylenepentamine; hexapropyleneheptamine; tri-(ethylethylene)tetramine; tetrabutylenepentamine; di-(1-methylbutylene)triamine; pentaamylenehexamine; tri-(1,2,2-trimethylethylene)tetramine; penta-(1,5-dimethylamylene)hexamine; di-(1 - methyl-4 - ethylbutylene)triamine; tetraoctylenepentamine; tridecylenetetramine; didodecylenetriamine; trioctadecylenetetramine; dieicosylenetriamine; penta-(1-methyl - 2 - benzylethylene)hexamine; tetra-(1-methyl-3-benzylpropylene)pentamine; and tetra-(1-ethyl-2-benzylethylene)pentamine.

Any monocarboxylic acid, or its acid anhydride or acid halide, can be reacted with the polyalkylene-polyamine reactant to produce the intermediate products used in preparing the corrosion inhibitor reaction products of the present invention. The aromatic and the heterocyclic monocarboxylic acids, as well as the aliphatic monocarboxylic acids, are utilizable. Monocarboxylic acids containing substituent groups, such as halogen atoms, are also applicable herein. However, the preferred monocarboxylic acid reactants are the aliphatic monocarboxylic acids, i.e., the saturated or unsaturated, branched-chain or straight-chain, monocarboxylic acids, and the acid halides and acid anhydrides thereof. Particularly preferred are the aliphatic monocarboxylic acid reactants having a relatively long carbon chain length, such as a carbon chain length of between about 10 carbon atoms and about 30 carbon atoms. Non-limiting examples of the monocarboxylic acid reactant are formic acid; acetic acid; fluoroacetic acid; acetic anhydride; acetyl chloride; propionic acid; propiolic acid; propionic acid anhydride, beta-chloropropionic acid; propionyl bromide; bromoacetic acid; butyric acid anhydride, isobutyric acid; alpha-bromobutyric acid; crotonic acid chloride, isocrotonic acid; beta-ethylacrylic acid; valeric acid; acrylic acid anhydride; hexanoic acid; hexanoyl chloride; caproic acid anhydride; sorbic acid; beta-chloroacrylic acid; nitrosobutyric acid; aminovaleric acid; aminohexanoic acid; heptanoic acid; 2-ethylhexanoic acid; decanoic acid; dodecanoic acid; undecylenic acid; tetradecanoic acid; myristoyl bromide; hexadecanoic acid; palmitic acid; oleic acid; stearic acid; linoleic acid; linolenic acid; phenylstearic acid; montanic acid; thiophene carboxylic acid; picolinic acid; nicotinic acid; benzoic acid; benzoyl chloride; toluic acid; xylic acid; cinnamic acid; salicylic acid; hydroxytoluic acid; and naphthoic acid.

In order to produce an intermediate product which has at least one nitrogen atom free to react chemically with the alkenyl succinic acid anhydride reactant to produce mixtures of reaction products representing the complete chemical interaction of the reactants, rather than physical mixtures of alkenyl succinic acid anhydride with intermediate products and/or the reaction product representing the complete chemical interaction of the reactants, it is essential that no more than $(x-2)$ mols of monocarboxylic acid reactant be reacted with each mol of polyalkylene-polyamine reactant, $x$ representing the number of nitrogen atoms in the polyalkylene-polyamine molecule. Thus, the proportion of monocarboxylic acid reactant to polyalkylene-polyamine reactant will vary between about 1:1, respectively, and about $(x-2):1$, respectively, when the corrosion inhibiting reaction products representing the complete chemical interaction of the reactants are desired. It is especially preferred to produce intermediate products having two unreacted nitrogen atoms. To produce such intermediate products, the maximum proportion of monocarboxylic acid reactant to polyalkylene-polyamine will be $(x-3):1$, respectively.

When the number of mols of monocarboxylic acid reactant is only one less than the number of nitrogen atoms in the polyalkylene-polyamine reactant, i.e., $(x-1)$ mols, the intermediate product apparently will not have any nitrogen atoms free for further reaction with the alkenyl succinic acid anhydride reactant. It has been discovered, however, that such intermediate products can be combined with the alkenyl succinic acid anhydride reactant to produce products, probably physical mixtures, which are nevertheless utilizable as corrosion inhibitors. Therefore, the proportion of monocarboxylic acid reactant to polyalkylene-polyamine reactant varies broadly between about 1:1, respectively, and about $(x-1):1$, respectively. For example, when tetraethylene-pentamine is utilized as the polyalkylene-polyamine reactant, one, two, three or even four mols of a monocarboxylic acid reactant can be reacted with each mol thereof, to produce intermediate products suitable for the purposes contemplated herein. In view of the foregoing, it will be understood that any designation assigned to these products, other than a definition comprising a recitation of the process of producing them, is not accurately descriptive of them.

The temperature at which the reaction between the monocarboxylic acid reactant and the polyalkylene-polyamine reactant is effected is not too critical. It is usually preferred to operate at temperatures varying between about 130° C. and about 160° C. It is to be understood, however, that the reaction between the monocarboxylic acid reactant and the polyalkylene-polyamine reactant can be effected at temperatures substantially lower than 130° C. and substantially higher than 160° C., and that the preparation of such is not to be limited to the preferred temperature range.

Water is formed as a by-product of the reaction between the monocarboxylic acid reactant and the polyalkylene-polyamine reactant. In order to facilitate the removal of this water, a hydrocarbon solvent which forms an azeotropic mixture with water can be added to the reaction mixture. Heating is continued with the liquid reaction mixture at the preferred reaction temperature, until the removal of water by azeotropic distillation has substantially ceased. In general, any hydrocarbon solvent which forms an azeotropic mixture with water can be used. It is preferred, however, to use an aromatic hydrocarbon solvent of the benzene series, such as benzene, toluene and xylene.

In practice, the reaction is continued until the formation of water has substantially ceased. In general, the time of reaction will vary between about six hours and about ten hours.

Any alkenyl succinic acid anhydride or the corresponding acid is utilizable for the production of the corrosion inhibitor reaction products of the present invention. The general structural formulae of these compounds are:

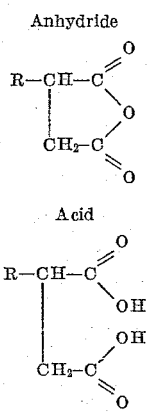

wherein R is an alkenyl radical. The alkenyl radical can be straight-chain or branched-chain; and it can be saturated at the point of unsaturation by the addition of a substance which adds to olefinic double bonds, such as hydrogen, sulfur, bromine, chlorine or iodine. It is obvious, of course, that there must be at least two carbon atoms in the alkenyl radical, but there is no real upper limit to the number of carbon atoms therein. However, it is preferred to use an alkenyl succinic acid anhydride reactant having between about 8 and about 18 carbon atoms per alkenyl radical. In order to produce the corrosion inhibitors of this invention, however, an alkenyl succinic acid anhydride or the corresponding acid must be used. Succinic acid anhydride and succinic acid are not utilizable herein. For example, the reaction product produced by reacting an intermediate product with succinic acid anhydride is an amorphous, dark, insoluble mass. Although their use is less desirable, the alkenyl succinic acids also react, in accordance with the aforedescribed process, to produce satisfactory corrosion inhibiting reaction products. It has been found, however, that their use necessitates the removal of water formed during the reaction and also often causes undesirable side reactions to occur to some extent. Nevertheless, the alkenyl succinic acid anhydrides and the alkenyl succinic acids are interchangeable for the purposes of preparing corrosion inhibitors of the present invention. Accordingly, when the term "alkenyl succinic acid anhydride" is used herein, it must be clearly understood that it embraces the alkenyl succinic acids as well as their anhydrides, and the derivatives thereof in which the olefinic double bond has been saturated as set forth hereinbefore. Non-limiting examples of the alkenyl succinic acid anhydride reactant are ethenyl succinic acid anhydrides; ethenyl succinic acid; ethyl succinic acid anhydride; propenyl succinic acid anhydride; sulfurized propenyl succinic acid anhydride; butenyl succinic acid; 2-methylbutenyl succinic acid anhydride; 1,2-dichloropentyl succinic acid anhydride; hexenyl succinic acid anhydride; sulfurized 3-methylpentenyl succinic acid anhydride; 3,3-dimethylbutenyl succinic acid; heptenyl succinic acid anhydride; octenyl succinic acid anhydride; 2-methylheptenyl succinic acid anhydride; 4-ethylhexenyl succinic acid; noneyl succinic acid anhydride; decenyl succinic acid; decenyl succinic acid anhydride; decyl succinic acid anhydride; undecenyl succinic acid anhydride; 1,2-dichloroundecyl succinic acid; dodecenyl succinic acid anhydride; dodecenyl succinic acid; 2-propylnonenyl succinic acid anhydride; tridecenyl succinic acid anhydride; tetradecenyl succinic acid anhydride; hexadecenyl succinic acid anhydride; sulfurized octadecenyl succinic acid; octadecyl succinic acid anhydride; 1,2-dibromo-2-methylpentadecenyl succinic acid anhydride; eicosenyl succinic acid anhydride; 2-octyldodecenyl succinic acid; hexacosenyl succinic acid anhydride; and hentriacontenyl succinic acid anhydride.

The methods of preparing the alkenyl succinic acid anhydrides are well known to those familiar with the art. The most feasible method is by the reaction of an olefin with maleic acid anhydride. Since relatively pure olefins are difficult to obtain, and when thus obtainable, are often too expensive for commercial use, alkenyl succinic acid anhydrides are usually prepared as mixtures by reacting mixtures of olefins with maleic acid anhydride. Such mixtures, as well as relatively pure anhydrides, are utilizable herein.

In general, the alkenyl succinic acid anhydride reactant is reacted with the intermediate product in a proportion of between about $(x-1)$ and about one mol of alkenyl succinic acid anhydride reactant for each mol of polyalkylene-polyamine reactant used in the preparation of the intermediate product, $x$ representing the number of nitrogen atoms in the polyalkylene-polyamine reactant molecule. The sum of the number of mols of monocarboxylic acid reactant and of alkenyl succinic acid anhydride reactant reacted with each mol of polyalkylene-polyamine reactant, in accordance with this invention, must not exceed the number of nitrogen atoms in the polyalkylene-polyamine reactant molecule. Accordingly, the maximum number of mols of alkenyl succinic acid anhydride reactant used is the difference between the number of nitrogen atoms in the polyalkylene-polyamine reactant molecule and the number of mols of monocarboxylic acid reactant used per mole of polyalkylene-polyamine reactant. However, the first molecule of the monocarboxylic acid reactant appears to react with two nitrogen atoms. Accordingly, in order to achieve a reaction product which does not involve a physical mixture of the intermediate product and/or the reaction product, representing the complete chemical interaction of the reactants, with the alkenyl succinic acid anhydride reactant, the sum of the number of mols of the monocarboxylic acid reactant and of the alkenyl succinic acid anhydride reactant reacted with each mol of polyalkylene-polyamine reactant must not exceed one less than the number of nitrogen atoms in the polyalkylene-polyamine molecule. In other words, the proportion of alkenyl succinic acid anhydride reactant to polyalkylene-polyamine reactant will vary between $(x-2):1$, respectively, and $1:1$, respectively. For example, when two mols of decanoic acid are reacted with one mol of tetra-ethylenepentamine to produce an intermediate product, one or two mols, but not more than two mols, of an alkenyl succinic acid anhydride is reacted with this intermediate product to produce a reaction product representing the complete chemical interaction of the reactants. However, three mols of an alkenyl succinic acid anhydride reactant can be reacted with this intermediate product to produce a product which comprises a physical mixture. Such a product is contemplated herein.

The reaction between the alkenyl succinic acid anhydride reactant and the intermediate product takes place at any temperature ranging from ambient temperatures and upwards. This reaction is apparently an amide formation reaction effected by the well-known addition of the anhydride group to an amino or imino group. This addition proceeds at any temperature, but temperatures of about 100° C. or lower are preferred. When an alkenyl succinic acid is used, water is formed. Therefore, in this case, the reaction temperature preferably should be higher than about 100° C.

The reaction between the alkenyl succinic acid anhydride reactant and the intermediate product proceeds smoothly in the absence of solvents, at atmospheric pressure. However, the occurrence of undesirable side reactions is minimized when a solvent is employed. Use of a solvent is preferable when the reaction product is to be used in a steam turbine lubricating oil. Since a small amount of water is usually formed also when an alkenyl succinic acid anhydride is used in the reaction, the solvent employed is preferably one which will form an azeotropic mixture with water. These solvents have been discussed fully hereinbefore in conjunction with the reaction between the monocarboxylic acid reactant and the polyalkylene-polyamine reactant. The same solvents and the same methods of using them are applicable to the reaction between the intermediate product and the alkenyl succinic acid anhydride reactant. For example, satisfactory products are prepared at temperatures varying between about 100° C. and about 110° C., using an aromatic hydrocarbon solvent of the benzene series.

The time of reaction is dependent on the size of the charge, the reaction temperature selected, and the means employed for removing any water from the reaction mixture. Ordinarily, the addition of the anhydride reactant is substantially complete within a few minutes. The more emulsive reaction products can be produced at temperatures below 100° C. for a reaction time of less than one hour. In order to ensure complete reaction, however, it is preferred to continue heating for several hours. For example, when benzene is used as the solvent at a temperature of 100–110° C., heating is continued for about five hours. When water is formed during the reaction, as when an alkenyl succinic acid is used, the completion of the reaction is indicated by a substantial decrease in the formation of water. In general, the reaction time will vary between several minutes and about ten hours.

For purposes of the present invention, it is preferred that the polyamine addition agent be prepared in an inert carrier, such as mineral oil or the chlorinated biphenyl base stock. The mineral oil or chlorinated biphenyl can be added to the reaction mixture of the aforedescribed intermediate product and alkenyl succinic acid anhydride reactant before they are reacted with each other. In an alternate procedure, the reaction product can be produced by the methods mentioned hereinbefore, and then the mineral oil or chlorinated biphenyl can be added to the reaction product while it is still hot. As the amount of the polyamine addition agent used in the fluid compositions of this invention is small, any mineral oil used as the inert carrier, which would be carried over into the fluid composition, would be of such a small magnitude as not to adversely affect any of the essential properties of the finished fluid composition. On the other hand, when chlorinated biphenyl is used as the inert carrier for the polyamine addition agent, no hydrocarbon oil would be carried over into the finished fluid composition.

The polyamine addition agents used in the fluid compositions of this invention are best defined by reciting the reactants and the number of mols of each which are used in the reaction. For example, a preferred polyamine addition agent is the reaction product produced by reacting one mole of oleic acid with one mol of triethylenetetramine to produce an intermediate product which is then reacted with two mols of a dodecenyl succinic acid anhydride.

As illustrative of the preparation of a preferred polyamine addition agent is the following:

EXAMPLE 2

Approximately 564 grams (substantially 2 mols) of oleic acid and approximately 219 grams (substantially 1.5 mols) of triethylenetetramine were placed in a reaction vessel which was provided with a stirrer, a thermometer and a reflux takeoff trap. The reflux takeoff was filled with benzene and the agitated reactant mix heated to 140° C. Then, about 26.5 grams of benzene were added to the reaction mixture such that refluxing occurred with a pot temperature of 140–142° C. The reaction was continued for ten hours, during which time 57 milliliters of an aqueous layer was collected. The solvent was removed from the reaction mixture by distillation at a pot temperature of 145° C., and under about 20 millimeters pressure. This intermediate product had an N.N of 5.5 and an average molecular weight of about 484.

Approximately 225.7 grams (substantially 0.466 mol) of this intermediate, approximately 285.7 grams (substantially 1.074 mols) of tetrapropenyl succinic acid anhydride (produced as follows:

350 parts by weight of propylene tetramer, boiling range 355–472° F., A.P.I. gravity of 48–51°, Bromine No. of 110.120, and 110 parts by weight of maleic anhydride were placed in a suitable reaction vessel and refluxed, about 170° C. for about 30 hours. The pressure was slowly decreased and the unreacted propylene tetramer distilled off. The residue was subjected to further vacuum distillation, whereupon there is obtained about 194 parts by weight tetrapropenyl succinic acid anhydride, a clear liquid having a specific gravity of about 1.0 at 25° C.), and about 500 grams of mineral oil (furfural refined Mid-Continent distillate stock, specific gravity 0.860, Saybolt viscosity of 155 seconds at 100° F.) were placed in a reaction vessel. The reaction vessel was equipped with a thermometer, a stirrer, and an outlet tube which, in turn, was connected to a manometer, a trap and a vacuum pump. The reactants were heated, with stirring, to 100° C. and the pressure in the reaction vessel was reduced to 50 millimeters. The reaction was continued under these conditions for three hours and the mass cooled to room temperature. The resultant solution (referred to hereinafter as the product of Example 2) contained about 50 percent by weight of the active polyamine addition agent. Five hundred grams of chlorinated biphenyl containing from about 20% to about 60% by weight of combined chlorine can be used in place of the 500 grams of mineral oil as used in this example.

As mentioned above, the polyamine addition agents which can be used with the fluid compositions of this invention not only impart anti-rust properties, but also provide an increase in lubricating properties of the fluid compositions. Thus, for example, whereas the fluid compositions of this invention give scar diameters of about 0.60 mm. in the Shell 4-ball test (described above), upon the addition of about 0.025% by weight of a polyamine addition agent, for example, the reaction product of tetrapropenyl succinic anhydride with an oleic acid-triethylenetetramine intermediate, the scar diameter was reduced to 0.54 mm. The addition of about 0.25% by weight of the same polyamine addition agent decreased the scar diameter to 0.45 mm. Thus, by the addition of the aforedescribed polyamine addition agent to the fluid compositions of this invention, anti-rust protection can be obtained and the anti-wear properties of the fluid compositions can also be enhanced. The quantity of polyamine addition agent to be used will, of course, vary depending upon, for example, anticipated requirements for anti-rust protection and/or desired increased anti-wear properties. Generally, about 0.005% to about 5.0% by weight will suffice for most applications whether added for anti-rust protection or to increase anti-wear, or for both.

In certain applications of the fluid compositions of this invention, it may be necessary for the fluid to possess at least mild extreme-pressure properties, so that various parts of the equipment utilizing said compositions which are subject to somewhat high surface loads will not rapidly wear out. Where such a situation exists, care must be exercised in the quantity of the polyamine addition agent which is used, since it has been found that certain concentrations of the polyamine addition agent have an antagonistic effect upon extreme-pressure properties. Thus, while the fluid compositions of this invention, when subject to a determination of extreme-pressure properties using an Almen load test machine, generally result in observed values for load (pounds) and torque (pounds per inch squared) of about 44 and 39, respectively, fluid compositions containing very small amounts (as would be sufficient to provide adequate rust inhibition for most applications) of the polyamine addition agent show decreased extreme-pressure properties. Thus, for example, when a fluid composition composed of about 1.0% of the thiophosphate prepared in Example 1, 0.025% of a polyamine addition agent (specifically the reaction product of tetrapropenyl succinic anhydride with an oleic acid-triethylenetretramine intermediate), and the remainder chlorinated biphenyl containing about 45% combined chlorine was tested on the Almen machine, observed values for load and torque were about 40 and 34, respectively; for a fluid composition of about 0.5% of the same thiophosphate, about 0.025% of the same polyamine addition agent, and the remainder chlorinated biphenyl containing about 45% combined chlorine, observed values of load and torque were about 36 and 42, respectively. It has been found, however, that if the amount of polyamine addition agent is increased to about 0.2% or more, the extreme-pressure properties of the fluid are increased to a value exceeding the extreme-pressure properties of compositions containing only the thiophosphate and chlorinated biphenyl. Thus, a fluid composition composed of about 0.5% of zinc dihexyldithiophosphate, about 0.25% of the polyamine addition agent referred to in the first Almen test, and the remainder chlorinated biphenyl containing about 45% combined chlorine gave observed values in the Almen test for load and torque of about 50 and 40, respectively. From about 0.2% to about 1% is a preferred range of concentration for the polyamine addition agent in the fluids of this invention, since, in addition to providing anti-rust protection, the anti-wear and extreme-pressure properties of said compositions are also improved.

The level of rust inhibition imparted to the fluid compositions of this invention by the polyamine addition agent can be determined by the procedure of the ASTM D-665 rust test. As measured by that test, fluid compositions containing as low as 0.025% of the polyamine addition agent were rated 10.0 at 48 hours; i.e., no rusting could be observed. Of course, as discussed above, it may be desirable to use more than 0.025% of the polyamine addition agent because of the desirability of improving the lubricating properties of the fluid compositions.

It is to be noted that the addition of the aforedescribed polyamine addition agents in the recommended concentrations has no apparent effect on the physical properties of the basic fluid compositions of this invention, at least as can be detected by the methods used in determining said properties. As evidence of this fact, the properties of a fluid composition containing a polyamine addition agent were determined using the same procedures as were used for the basic fluid compositions of this invention. This composition and its properties are given in Table III below. The specific composition of the fluid tested is as follows:

| Ingredient: | Weight percent |
|---|---|
| Chlorinated biphenyl containing 45% combined chlorine | 99.30 |
| Zinc dihexyldithiophosphate (Example 1) | 0.45 |
| Reaction product of tetrapropenyl succinic anhydride with an oleic acid-triethylenetetramine intermediate (Example 2) | 0.25 |

*Table III*

| Property or test: | Observed |
|---|---|
| Color and form | Light yellow oily liquid, slightly cloudy. |
| Specific gravity 15° C./25° C. | 1.43. |
| Flash point, ° F. | 380. |
| Fire point, ° F. | None (up to boiling). |
| Pour point, ° F | 5. |
| Viscosity, Saybolt Universal seconds— | |
| 210° F. | 35.8. |
| 100° F. | 142. |
| 40° F. | 8500. |
| Hot manifold | Does not flash or burn on tube or after leaving tube. |
| Low-pressure spray flammability | Flame brightened but did not increase. |
| High-pressure spray flammability | Will not ignite. |

The functional fluids of this invention are also excellent bases for the preparation of grease-like lubricants which may be prepared by adding various or combinations of thickening agents or swelling agents to the functional fluids, such as any one of the known sodium, barium, lithium, potassium or calcium soaps, or other agents such as the $C_{16}$-$C_{18}$ dialkyl quaternary ammonium salts of montmorillonite. When the functional fluids of this invention are thickened with such agents, the resulting compositions have a grease-like consistency of good lubricating properties.

Although the functional fluid compositions described above are generally quite suitable for most applications, it may also be desirable to add small amounts of various other functional addition agents such as viscosity index improvers, e.g., a polymerized methacrylate ester, an alkylated polystyrene, or the polyether condensation products of ethylene oxide or propylene oxide, or both, with a glycol such as ethylene glycol, propylene glycol, butanediol, etc., or with an aliphatic alcohol such as butanol, octanol, decanol, tridecanol, etc., pour point depressors, oxidation inhibitors, detergents, other corrosion- and rust-inhibiting agents, other anti-wear and lubricity agents, anti-foaming agents such as the silicone polymers, and the like.

While this invention has been described with respect to certain embodiments, it is to be understood that it is not so limited in that variations and modifications thereof obvious to those skilled in the art may be employed without departing from the spirit or scope of this invention.

What is claimed is:

1. A composition comprising a major proportion of chlorinated biphenyl having from about 20% to about 60% combined chlorine, from about 0.01% to about 5.0% by weight of a polyvalent metal salt of an ester of a thiophosphoric acid represented by the structure,

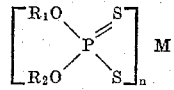

wherein M is a salt-forming polyvalent metal, $n$ is the valence of said metal, and $R_1$ and $R_2$ are selected from the group consisting of saturated acyclic and saturated alicyclic radicals of 1 to 30 carbon atoms and aromatic and substituted aromatic radicals of 6 to 30 carbon atoms, and from about 0.005% to about 5.0% by weight of the reaction product obtained by reacting a monocarboxylic acid with a polyalkylene-polyamine having one more nitrogen atom per molecule than there are alkylene groups in the molecule, in a molar proportion varying between about one and about $(x-1)$ to one, respectively, wherein $x$ represents the number of nitrogen atoms in the polyalkylene-polyamine molecule, to produce an intermediate product, and reacting an alkenyl succinic acid anhydride with said intermediate product, in a molar proportion varying between about $(x-1)$ and about one to one, respectively; the sum of the number of mols of said monocarboxylic acid and of said alkenyl succinic acid anhydride reacted with each mol of said polyalkylene-polyamine being no greater than $x$.

2. A composition comprising a major proportion of chlorinated biphenyl having from about 40% to about 55% combined chlorine, from about 0.01% to about 5.0% by weight of a polyvalent salt of an ester of a thiophosphoric acid represented by the structure,

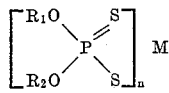

wherein M is a salt-forming polyvalent metal, $n$ is the valence of said metal, and $R_1$ and $R_2$ are selected from the group consisting of saturated acyclic and saturated alicyclic radicals of 3 to 15 carbon atoms and aromatic and substituted aromatic radicals of 6 to 15 carbon atoms, and from 0.005% to about 5.0% by weight of the reaction product obtained by reacting a monocarboxylic acid with a polyalkylene-polyamine having one more nitrogen atom per molecule than there are alkylene groups in the molecule, in a molar proportion varying between about one and about $(x-1)$ to one, respectively, wherein $x$ represents the number of nitrogen atoms in the polyalkylene-polyamine molecule, to produce an intermediate product, and reacting an alkenyl succinic acid anhydride with said intermediate product, in a molar proportion varying between about $(x-1)$ and about one to one, respectively; the sum of the number of mols of said monocarboxylic acid and of said alkenyl succinic acid anhydride reacted with each mol of said polyalkylene-polyamine being no greater than $x$.

3. A composition comprising a major proportion of chlorinated biphenyl having from about 40% to about 55% combined chlorine, from about 0.01% to about 5.0% by weight of a polyvalent metal salt of an ester of a thiophosphoric acid represented by the structure,

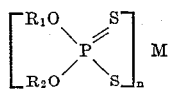

wherein M is a salt-forming polyvalent metal, $n$ is the valence of said metal, and $R_1$ and $R_2$ are selected from the group consisting of alkyl and cycloalkyl radicals of 3 to 15 carbon atoms, and from about 0.005% to about 5.0% by weight of the reaction product obtained by reacting an aliphatic monocarboxylic acid with a polyethylene-polyamine having one more nitrogen atom per molecule than there are ethylene groups in the molecule and having between about two and about six ethylene groups per molecule, in a molar proportion varying between about one and about $(x-1)$ to one, respectively, wherein $x$ represents the number of nitrogen atoms in the polyethylene-polyamine molecule, to produce an intermediate product, and reacting an alkenyl succinic acid anhydride, having between about 8 and about 18 carbon atoms per alkenyl radical, with said intermediate product, in a molar proportion varying between about $(x-1)$ and about one to one, respectively; the sum of the number of mols of said aliphatic monocarboxylic acid and of said alkenyl succinic acid anhydride reacted with each mol of said polyethylene-polyamine being no greater than $x$.

4. A composition comprising a major proportion of chlorinated biphenyl having from about 40% to about 55% combined chlorine, from about 0.01% to about 5.0% by weight of a polyvalent salt of an ester of a thiophosphoric acid represented by the structure,

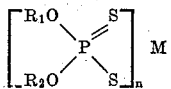

wherein M is a salt-forming polyvalent metal, $n$ is the valence of said metal, and $R_1$ and $R_2$ are selected from the group consisting of saturated acyclic radicals of 3 to 15 carbon atoms and aromatic and substituted aromatic radicals of 6 to 15 carbon atoms, and from about 0.005% to about 5.0% by weight of the reaction product obtained by reacting oleic acid with triethylenetetramine, in a molar proportion varying between about one and about three to one, respectively, to produce an intermediate product, and reacting triisobutenyl succinic acid anhydride with said intermediate product, in molar proportion varying between about three and about one to one, respectively; the sum of the number of mols of said oleic acid and of said triisobutenyl succinic acid anhydride reacted with each mole of said triethylenetetramine being no greater than four.

5. A composition comprising a major proportion of chlorinated biphenyl having from about 40% to about 55% combined chlorine, from about 0.01% to about 5.0% by weight of a polyvalent salt of an ester of a thiophosphoric acid represented by the structure, $$\left[ \begin{array}{c} R_1O \\ R_2O \end{array} \!\!\! \begin{array}{c} S \\ P \\ S \end{array} \right]_n M$$

wherein M is a salt-forming polyvalent metal, $n$ is the valence of said metal, and $R_1$ and $R_2$ are selected from the group consisting of saturated acyclic and saturated alicyclic radicals of 3 to 15 carbon atoms and aromatic and substituted aromatic radicals of 6 to 15 carbon atoms, and from about 0.005% to about 5.0% by weight of the reaction product obtained by reacting oleic acid with triethylenetetramine, in a molar proportion varying between about one and about three to one, respectively, to produce an intermediate product, and reacting tetrapropenyl succinic acid anhydride with said intermediate product, in a molar proportion varying between about three and about one to one, respectively; the sum of the number of mols of said oleic acid and of said tetrapropenyl succinic anhydride reacted with each mol of said triethylenetetramine being no greater than four.

6. A composition comprising a major proportion of chlorinated biphenyl having from about 40% to about 55% combined chlorine, from about 0.01% to about 5.0% by weight of a polyvalent metal salt of an ester of a thiophosphoric acid represented by the structure, $$\left[ \begin{array}{c} R_1O \\ R_2O \end{array} \!\!\! \begin{array}{c} S \\ P \\ S \end{array} \right]_n M$$

wherein M is a salt-forming polyvalent metal, $n$ is the valence of said metal, and $R_1$ and $R_2$ are selected from the group consisting of alkyl and cycloalkyl radicals of 3 to 15 carbon atoms, and from about 0.2% to 1% by weight of the reaction product obtained by reacting oleic acid with triethylenetetramine, in a molar proportion varying between about one and about three to one, respectively, to produce an intermediate product, and reacting tetrapropenyl succinic acid anhydride with said intermediate product, in a molar proportion varying between about three and about one to one, respectively; the sum of the number of mols of said oleic acid and of said tetrapropenyl succinic anhyride reacted with each mol of said triethylenetetramine being no greater than four.

7. A composition comprising a major proportion of chlorinated biphenyl having from about 40% to about 55% combined chlorine, from about 0.01% to about 5.0% by weight of a zinc salt of an ester of a thiophosphoric acid represented by the structure,

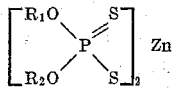

wherein $R_1$ and $R_2$ are selected from the group consisting of saturated acyclic and saturated alicyclic radicals of 3 to 15 carbon atoms and aromatic and substituted aromatic radicals of 6 to 15 carbon atoms, and from about 0.2% to about 1.0% by weight of the reaction product obtained by reacting oleic acid with triethylenetetramine, in a molar proportion varying between about one and about three to one, respectively, to produce an intermediate product, and reacting tetrapropenyl succinic acid anhydride with said intermediate product, in a molar proportion varying between about three and about one to one, respectively; the sum of the number of mols of said oleic acid and of said tetrapropenyl succinic acid anhydride reacted with each mol of said triethylenetetramine being no greater than four.

8. A composition comprising a major proportion of chlorinated biphenyl having from about 40% to about 55% combined chlorine, from about 0.1% to about 1.0% of zinc dihexyldithiophosphate, and from about 0.005% to about 5.0% by weight of the reaction product obtained by reacting oleic acid with triethylenetetramine, in a molar proportion varying between about one and about three to one, respectively, to produce an intermediate product, and reacting tetrapropenyl succinic acid anhydride with said intermediate product, in a molar proportion varying between about three and about one to one, respectively; the sum of the number of mols of said oleic acid and of said tetrapropenyl succinic anhydride reacted with each mol of said triethylenetetramine being no greater than four.

9. A composition comprising a major proportion of chlorinated biphenyl having from about 40% to about 55% combined chlorine, from about 0.1% to about 1.0% by weight of a polyvalent metal salt of an ester of a thiophosphoric acid represented by the structure,

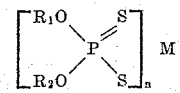

wherein M is a salt-forming polyvalent metal, $n$ is the valence of said metal, and $R_1$ and $R_2$ are selected from the group consisting of alkyl and cycloalkyl radicals of 3 to 15 atoms, and from about 0.005% to about 5.0% by weight of the reaction product obtained by reacting oleic acid with triethylenetetramine, in a molar proportion varying between about one and about three to one, respectively, to produce an intermediate product, and reacting tetrapropenyl succinic acid anhydride with said intermediate product, in a molar proportion varying between about three and about one to one, respectively; the sum of the number of mols of said oleic acid and of said tetrapropenyl succinic anhydride reacted with each mol of said triethylenetetramine being no greater than four.

References Cited in the file of this patent

UNITED STATES PATENTS

| | | |
|---|---|---|
| 2,364,284 | Freuler | Dec. 5, 1944 |
| 2,568,876 | White et al. | Sept. 25, 1951 |
| 2,741,598 | Good | Apr. 10, 1956 |
| 2,771,417 | Ryznar | Nov. 20, 1956 |